US012498660B2

(12) United States Patent
Kubota

(10) Patent No.: US 12,498,660 B2
(45) Date of Patent: Dec. 16, 2025

(54) FIXING DEVICE AND IMAGE FORMING APPARATUS

(71) Applicant: FUJIFILM BUSINESS INNOVATION CORP., Tokyo (JP)

(72) Inventor: Ryosuke Kubota, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/750,105

(22) Filed: Jun. 21, 2024

(65) Prior Publication Data

US 2025/0216807 A1 Jul. 3, 2025

(30) Foreign Application Priority Data

Dec. 28, 2023 (JP) ................................ 2023-223061

(51) Int. Cl.
*G03G 15/20* (2006.01)

(52) U.S. Cl.
CPC ..... *G03G 15/2057* (2013.01); *G03G 15/2064* (2013.01)

(58) Field of Classification Search
None
See application file for complete search history.

(56) References Cited

U.S. PATENT DOCUMENTS

2007/0280755 A1* 12/2007 Matsumoto ........ G03G 15/2025 399/329
2009/0010686 A1* 1/2009 Matsumoto ........ G03G 15/2057 399/324
2013/0223903 A1 8/2013 Matsuura
2015/0286170 A1* 10/2015 Notoya ............. G03G 15/2025 399/327
2020/0393782 A1 12/2020 Nakamura et al.
2020/0409292 A1* 12/2020 Fujimoto ........... G03G 15/2025
2022/0179345 A1* 6/2022 Tanaka ............... G03G 15/2057
2022/0299920 A1* 9/2022 Shimada ............ G03G 15/2025
2022/0382190 A1 12/2022 Nakao
2022/0382192 A1 12/2022 Inoue et al.

FOREIGN PATENT DOCUMENTS

JP 2005-091557 A 4/2005
JP 2022-184460 A 12/2022

OTHER PUBLICATIONS

Abbot and Firestone, Specifying Surface Quality, Mechanical Engineering, vol. 55, No. 9, pp. 569-572 (Sep. 1933).*
Dec. 9, 2024 Search Report issued in European Patent Application No. 24184153.5.

* cited by examiner

*Primary Examiner* — Sevan A Aydin
(74) *Attorney, Agent, or Firm* — Oliff PLC

(57) ABSTRACT

A fixing device includes: a first rotatable member; a second rotatable member disposed in contact with the first rotatable member; a pressing member that is disposed along an inner circumferential surface of the second rotatable member and presses the inner circumferential surface of the second rotatable member such that the second rotatable member is pressed against the first rotatable member; a sliding member interposed between the inner circumferential surface of the second rotatable member and the pressing member; and a lubricant interposed between the inner circumferential surface of the second rotatable member and the sliding member. The sliding member has an irregular sliding surface having a surface roughness Ra1 of 0.20 μm or more and a material ratio Rmr of 35% or more.

20 Claims, 4 Drawing Sheets

FIXING DEVICE AND IMAGE FORMING APPARATUS

CROSS-REFERENCE TO RELATED APPLICATIONS

This application is based on and claims priority under 35 USC 119 from Japanese Patent Application No. 2023-223061 filed Dec. 28, 2023.

BACKGROUND

(i) Technical Field

The present disclosure relates to a fixing device and an image forming apparatus.

(ii) Related Art

For example, Japanese Unexamined Patent Application Publication No. 2005-091557 discloses "a sliding member for an electrophotographic apparatus that has an irregular surface so that a lubricant is interposed between the irregular surface and a surface to be in contact therewith, wherein the ten-point average roughness Rz of the surface in the sliding direction is larger than the ten-point average roughness Rz in a direction perpendicular to the sliding direction."

Japanese Unexamined Patent Application Publication No. 2022-184460 discloses "a belt device including: a rotatable endless belt; a sliding member slidable relative to the inner circumferential surface of the belt; a pressing member that is in contact with the sliding member with the belt interposed therebetween to form a nip between the pressing member and the belt; and a lubricant interposed between the inner circumferential surface of the belt and the sliding member, wherein the belt and the sliding member slide against each other on their respective sliding surfaces, wherein the elastic power of the sliding surface of the belt is 55% or more, and wherein the surface roughness of the sliding surface of the sliding member is larger than the surface roughness of the sliding surface of the belt."

SUMMARY

One previously known fixing device includes: a first rotatable member; a second rotatable member disposed in contact with the first rotatable member; a pressing member that is disposed along an inner circumferential surface of the second rotatable member and presses the inner circumferential surface of the second rotatable member such that the second rotatable member is pressed against the first rotatable member; a sliding member interposed between the inner circumferential surface of the second rotatable member and the pressing member; and a lubricant interposed between the inner circumferential surface of the second rotatable member and the sliding member (this fixing device is hereinafter referred to also as a specific fixing device).

Aspects of non-limiting embodiments of the present disclosure relate to a fixing device in which the occurrence of scratches on the inner circumferential surface of a fixing member (i.e., the second rotatable member) is less than that in the specific fixing device in which the surface roughness Ra1 of the sliding surface of the sliding member is less than 0.20 μm or in which the material ratio Rmr of the sliding surface of the sliding member is less than 35%.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a fixing device including:

- a first rotatable member;
- a second rotatable member disposed in contact with the first rotatable member;
- a pressing member that is disposed along an inner circumferential surface of the second rotatable member and presses the inner circumferential surface of the second rotatable member such that the second rotatable member is pressed against the first rotatable member;
- a sliding member interposed between the inner circumferential surface of the second rotatable member and the pressing member; and
- a lubricant interposed between the inner circumferential surface of the second rotatable member and the sliding member, wherein the sliding member has an irregular sliding surface having a surface roughness Ra1 of 0.20 μm or more and a material ratio Rmr of 35% or more.

BRIEF DESCRIPTION OF THE DRAWINGS

An exemplary embodiment of the present disclosure will be described in detail based on the following figures, wherein.

DETAILED DESCRIPTION

Figure 1:
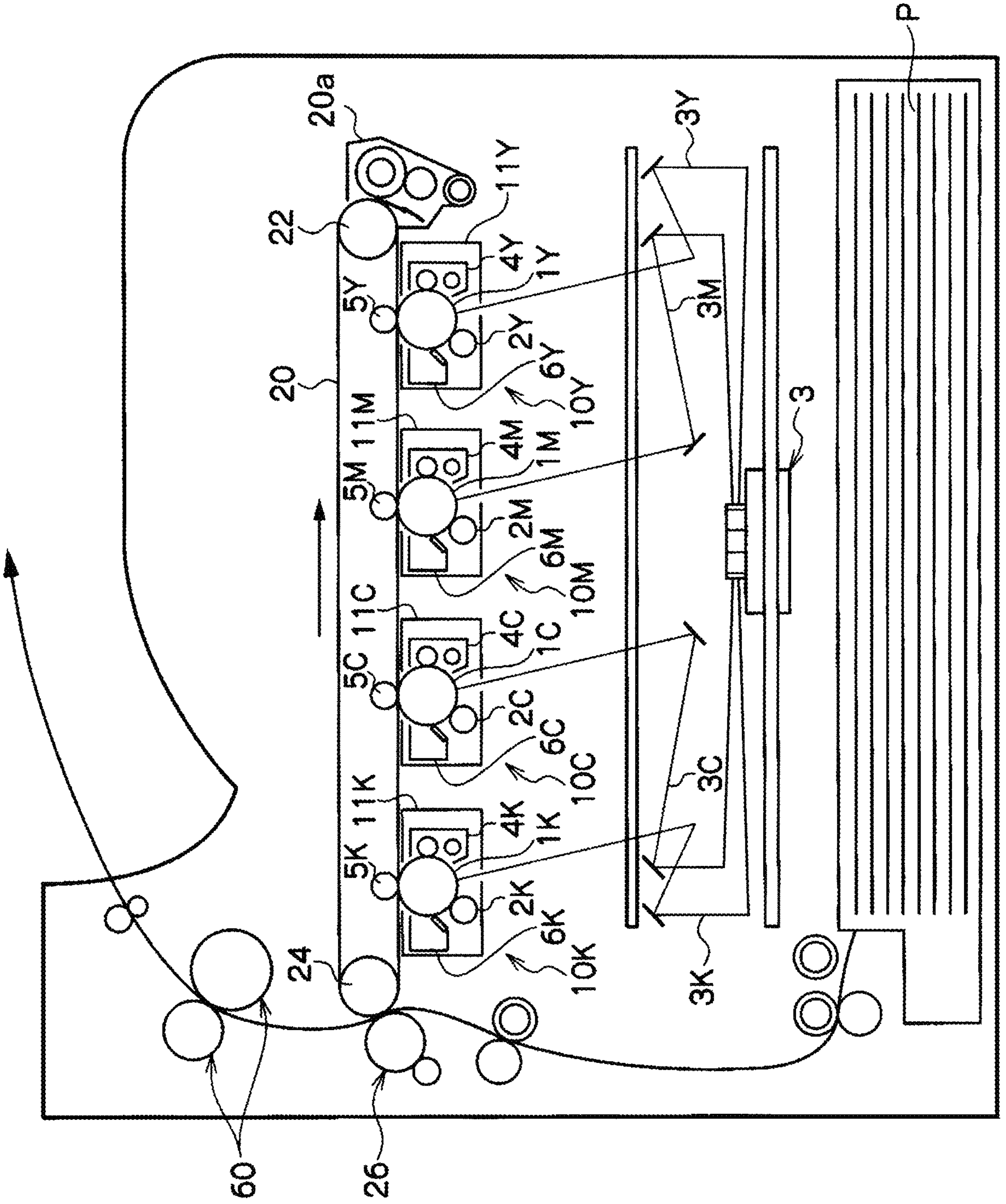
FIG. 1 is a is a schematic illustration showing an example of an image forming apparatus according to an exemplary embodiment.

An exemplary embodiment of the present disclosure will be described below. The following description and Examples are illustrative of the exemplary embodiment and are not intended to limit the scope of the present disclosure.

In a set of numerical ranges expressed in a stepwise manner in the present specification, the upper or lower limit in one numerical range may be replaced with the upper or lower limit in another numerical range in the set of numerical ranges. Moreover, in a numerical range described in the present specification, the upper or lower limit in the numerical range may be replaced with a value indicated in an Example.

Any component may contain a plurality of materials corresponding to the component.

When reference is made to the amount of a component in a composition, if the composition contains a plurality of materials corresponding to the component, the amount means the total amount of the plurality of materials in the composition, unless otherwise specified.

When the exemplary embodiment is described with reference to the drawings, components having substantially the same function are denoted by the same symbol throughout all the drawings, and their redundant description may be omitted.

<Fixing Device/Image Forming Apparatus>

A fixing device according to the exemplary embodiment includes: a first rotatable member; a second rotatable member disposed in contact with the first rotatable member; a pressing member that is disposed along the inner circumferential surface of the second rotatable member and presses the inner circumferential surface of the second rotatable member such that the second rotatable member is pressed against the first rotatable member; a sliding member interposed between the inner circumferential surface of the second rotatable member and the pressing member; and a lubricant interposed between the inner circumferential surface of the second rotatable member and the sliding member. The sliding member has an irregular sliding surface having a surface roughness Ra1 of 0.20 μm or more and a material ratio Rmr of 35% or more.

An image forming apparatus according to the exemplary embodiment includes:

an image holding member;

a latent image forming device that forms a latent image on a surface of the image holding member;

a developing device that develops the latent image using a developer to form a toner image;

a transfer device that transfers the developed toner image onto a recording medium; and a fixing device that fixes the toner image to the recording medium.

The fixing device according to the exemplary embodiment is applied to the image forming apparatus according to the exemplary embodiment.

In the fixing device and the image forming apparatus in the exemplary embodiment that have the structures described above, the occurrence of scratches on the inner circumferential surface of the fixing member is reduced. The reason for this may be as follows.

To form an image using a conventional electrophotographic image forming apparatus such as a printer, a copier, or a facsimile, first, a toner image is transferred onto a recording medium such as a recording paper sheet. Then the recording medium with the toner image transferred thereonto is heated and pressurized in a fixing device to thereby fix the toner image to the surface of the recording medium.

Various types of fixing devices have been proposed. One of them is the specific fixing device described above.

In one proposed specific fixing device, in order to retain the lubricant between the inner circumferential surface of the second rotatable member and the sliding surface of the sliding member, the sliding member has a sliding surface having irregularities. However, in this conventional sliding member, the irregular shape of the sliding surface tends to cause scratches on the inner circumferential surface of the second rotatable member (e.g., a fixing belt such as a pressing belt) during sliding. Therefore, it is difficult to retain the lubricant in such locally scratched regions. Since the sliding member and the second rotatable member come into direct contact with each other, wear of the second rotatable member and an increase in the rotational torque tend to occur.

However, in the fixing device according to the exemplary embodiment, the sliding surface of the sliding member has irregularities and has a surface roughness Ra1 of 0.20 μm or more and a material ratio Rmr of 35% or more.

Figure 4:
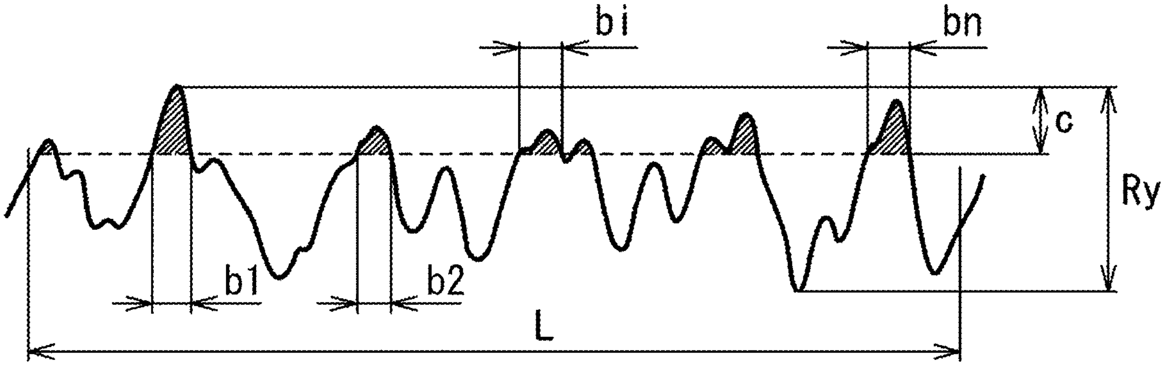
FIG. 4 is a schematic illustration showing how to determine a material ratio Rmr.

The material ratio Rmr will be described with reference to FIG. 4. FIG. 4 is a schematic illustration showing how to determine the material ratio Rmr. As shown in FIG. 4, first, a roughness curve of the sliding surface of the sliding member in the axial direction is determined, and a portion of the roughness curve having a reference length L in the direction of the average line is sampled. The roughness curve in the sampled portion is cut at a cutting level c (%) parallel to a peak line. Then the percentage ratio of the sum of cut lengths (material length $\eta p = b1 + b2 + \ldots + bn$) to the reference length L is used as the material ratio Rmr ($= \eta p / L \times 100$). The cutting level c used to determine the material ratio Rmr is the percentage ratio relative to the maximum height Ry that is the distance between the peak line of the cut portion and the valley line. The highest peak level is set to 0%, and the lowest valley level is set to 100%.

As described above, the material ratio Rmr indicates the degree of smoothness of convex portions on the sliding surface of the sliding member. In the exemplary embodiment, the material ratio Rmr is 35% or more, and the surface roughness Ra1 is 0.20 μm or more. This means that, although the sliding surface of the sliding member in contact with the inner circumferential surface of the second rotatable member has irregularities, the peaks of the convex portions are blunt, i.e., appropriately smooth. Therefore, the occurrence of scratches on the inner circumferential surface of the second rotatable member during sliding is reduced. As a result, the lubricant interposed between the inner circumferential surface of the second rotatable member and the sliding member can be easily retained, and this may prevent the wear of the inner circumferential surface of the second rotatable member and an increase in the rotational torque.

An example of the image forming apparatus according to the exemplary embodiment will be described with reference to the drawings.

FIG. 1 is a schematic illustration showing an example of the image forming apparatus according to the exemplary embodiment.

Figure 2:
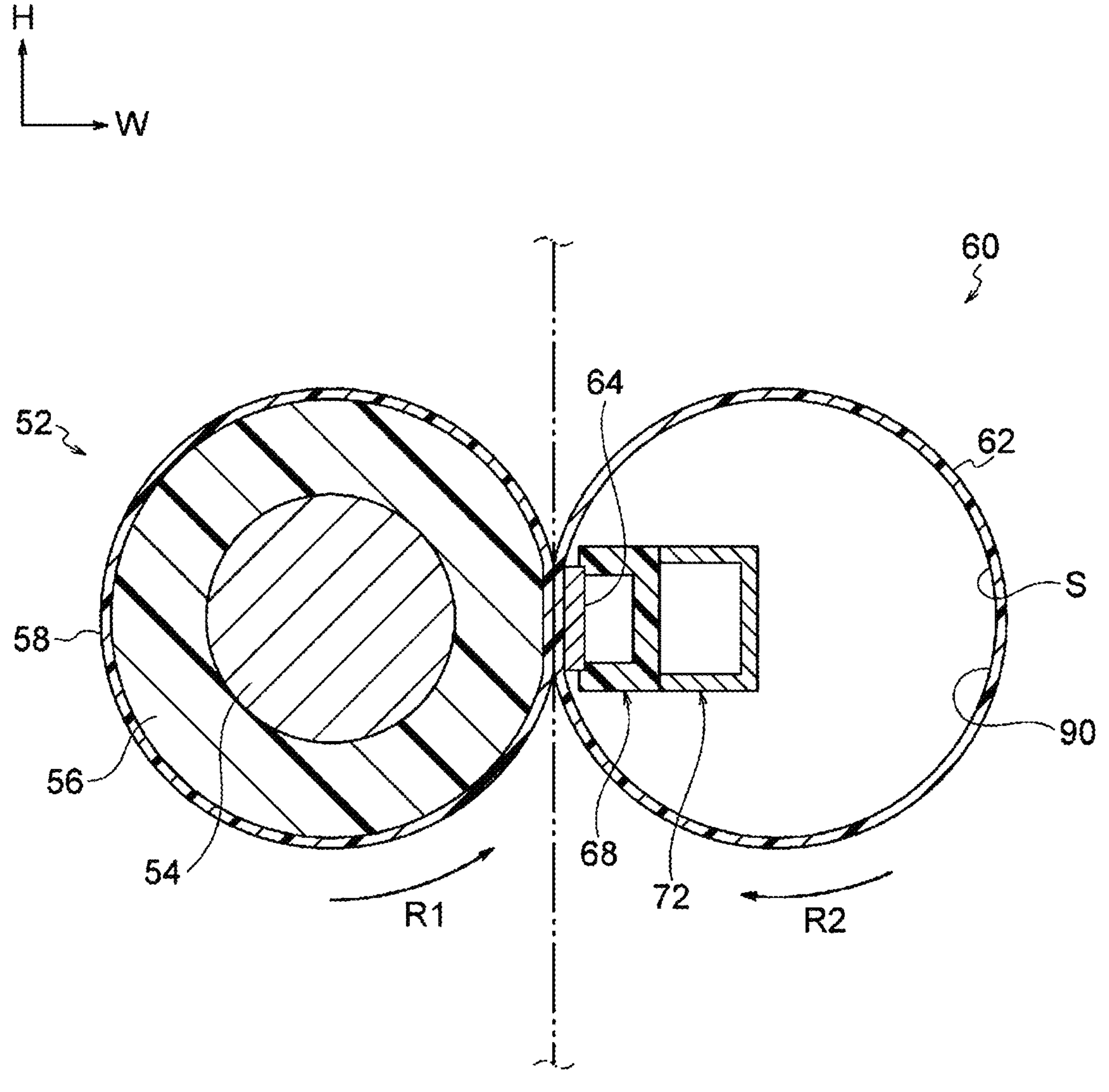
FIG. 2 is a schematic illustration showing an example of a fixing device according to the exemplary embodiment.

FIG. 2 is a schematic illustration showing an example of the fixing device according to the exemplary embodiment.

Figure 3:
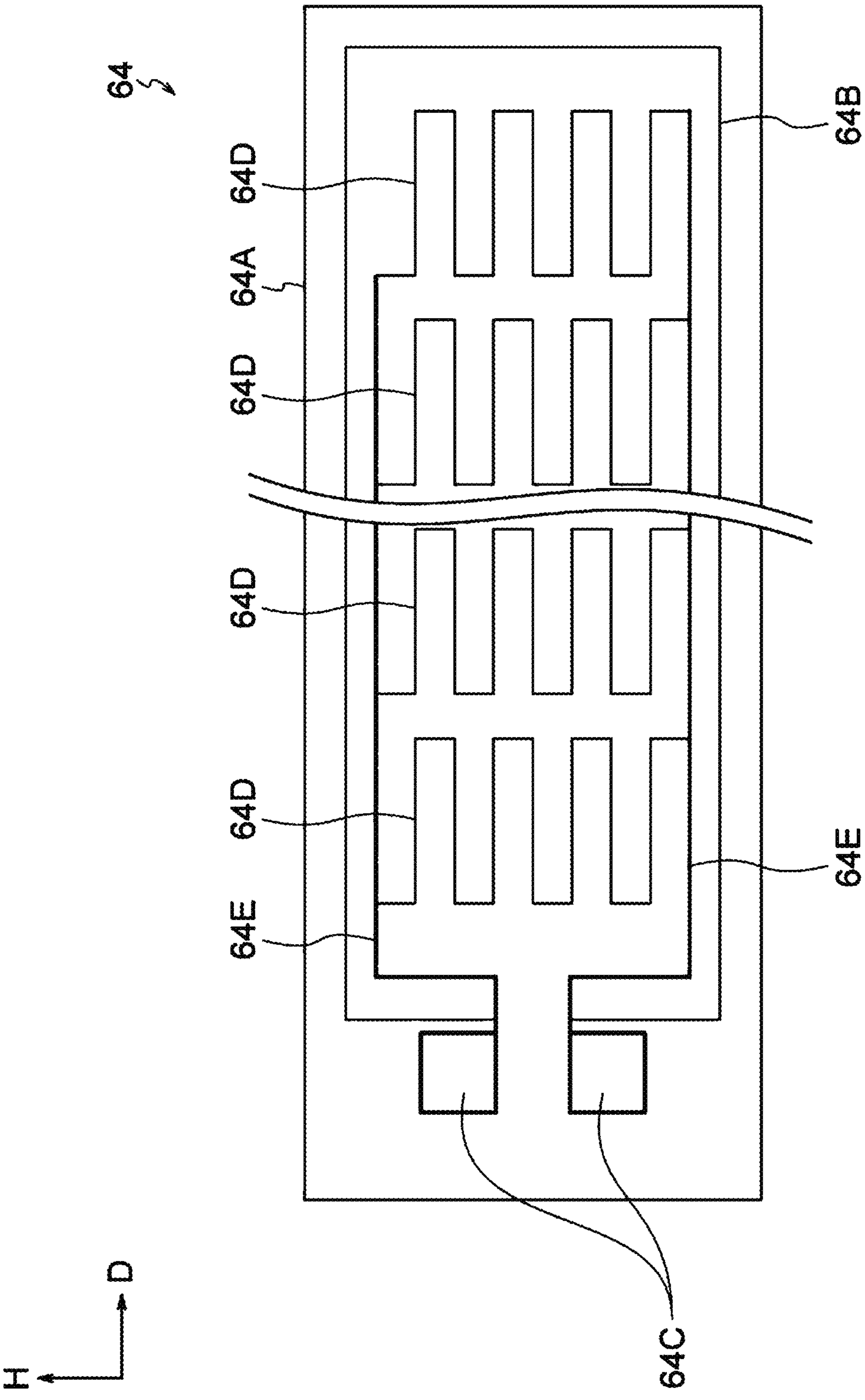
FIG. 3 is a plan view showing an example of a planar heating element of the fixing device according to the exemplary embodiment.

FIG. 3 is a plan view showing an example of a planar heating element 64 in the fixing device according to the exemplary embodiment.

(Structure of Image Forming Apparatus)

As shown in FIG. 1, the image forming apparatus 100 according to the exemplary embodiment includes first to fourth electrophotographic process cartridges 10Y, 10M, 10C, and 10K (examples of an image forming unit) that output yellow (Y), magenta (M), cyan (C), and black (K) images, respectively, based on color-separated image data. These process cartridges 10Y, 10M, 10C, and 10K are arranged so as to be spaced apart from each other along the outer circumferential surface of an intermediate transfer belt 20. These process cartridges 10Y, 10M, 10C, and 10K are detachably attached to the image forming apparatus.

The intermediate transfer belt 20 serving as an intermediate transfer body is disposed above (in FIG. 1) the process cartridges 10Y, 10M, 10C, and 10K such that the outer circumferential surface of the intermediate transfer belt 20 faces the process cartridges. The intermediate transfer belt 20 is wound around a driving roller 22 and a support roller 24 that are disposed so as to be spaced apart from each other, the support roller 24 being in contact with the inner circumferential surface of the intermediate transfer belt 20. The intermediate transfer belt 20 is tensioned between these rollers and runs endlessly in a direction from the first process cartridge 10Y toward the fourth process cartridge 10K.

The support roller 24 is pressed by an unillustrated elastic member such as a spring in a direction away from the driving roller 22, and a tension is thereby applied to the intermediate transfer belt 20 wound between these rollers. An intermediate transfer body cleaning device 20*a* is disposed on the outer circumferential surface of the intermediate transfer belt 20 so as to be opposed to the driving roller 22.

Since the first to fourth process cartridges 10Y, 10M, 10C, and 10K have substantially the same structure, the first process cartridge 10Y that is disposed on an upstream side in the running direction of the intermediate transfer belt and forms a yellow image will be described as a representative. The same portions of the second to fourth process cartridges 10M, 10C, and 10K as those in the first process cartridge 10Y are designated by the same reference symbols with the letter yellow (Y) replaced with magenta (M), cyan (C), and black (K), and their description will be omitted.

The first process cartridge 10Y includes a photoconductor 1Y serving as the image holding member. A charging roller (an example of a charging device) 2Y that charges the surface of the photoconductor 1Y to a prescribed potential, a developing device 4Y that supplies a charged toner contained in a developer to an electrostatic latent image to develop the electrostatic latent image, and a photoconductor cleaning device 6Y that removes the toner remaining on the surface of the photoconductor 1Y after first transfer are sequentially disposed around the photoconductor 1Y. These are disposed integrally in a housing 11Y (casing). In the second to fourth process cartridges 10M to 10K also, their components are disposed integrally in respective housings 11M to 11K (casings).

A first transfer roller 5Y (an example of a first transfer device) that transfers the developed toner image onto the intermediate transfer belt 20 and an exposure device 3 that irradiates the charged surface with a laser beam 3Y according to a color-separated image signal to form an electrostatic latent image are disposed together with the first process cartridge 10Y to thereby form an image forming unit.

The charging roller 2Y and the exposure device 3 correspond to an example of the latent image forming device.

The first transfer roller 5Y is disposed on the inner side of the intermediate transfer belt 20 and located at a position opposed to the photoconductor 1Y. Bias power sources (not shown) that apply first transfer biases are connected to the first transfer rollers 5Y, 5M, 5C, and 5K. Each bias power source is controlled by an unillustrated controller and changes the transfer bias applied to the corresponding first transfer roller.

(Structure of Fixing Device)

As shown in FIG. 2, the fixing device 60 includes a cylindrical pressing roller 52 (an example of the first rotatable member) extending in the depth direction of the apparatus, a pressing belt 62 (an example of the second rotatable member), and the planar heating element 64 (an example of the sliding member). The fixing device 60 further includes a pressing member 68 supporting the planar heating element 64 and a frame member 72 supporting the pressing member 68.

The planar heating element 64 generates heat for heating. The planar heating element 64 is disposed on the inner side of the pressing belt 62 and located on the side opposite from the pressing roller 52 with the pressing belt 62 interposed therebetween. The planar heating element 64 is a plate-shaped member having plate surfaces facing the width direction of the apparatus and extends from one end of the pressing belt 62 in the depth direction of the apparatus to the other end.

As shown in FIG. 3, the planar heating element 64 has a rectangular shape extending in the depth direction of the apparatus when viewed in the thickness direction. The planar heating element 64 includes an electrically insulating substrate 64A, an insulating layer 64B formed of a heat-resistant resin material, and a pair of electrodes 64C for voltage application. The planar heating element 64 further includes a plurality of resistance heat generating portions 64D that generate heat when voltage is applied to the electrodes 64C and a pair of connecting portions 64E that electrically connect the electrodes 64C to the respective opposite ends of each heat generating portion 64D. The electrodes 64C, the heat generating portions 64D, and the connecting portions 64E are formed on the substrate 64A, and the heat generating portions 64D and the connecting portions 64E are covered with the insulating layer 64B from the side opposite from the substrate 64A.

Next, the operation of the fixing device 60 will be described.

When a toner image transferred onto a sheet member P is fixed to the sheet member P, rotational force is transmitted from an unillustrated motor to the pressing roller 52, and the pressing roller 52 rotates in the direction of an arrow R1 as shown in FIG. 2. Then the pressing belt 62 in contact with the pressing roller 52 follows the rotating pressing roller 52 and circulates in the direction of an arrow R2 while sliding over the planar heating element 64. A lubricant S is retained between the inner circumferential surface 90 of the pressing belt 62 and the planar heating element 64. The lubricant S prevents an increase in sliding resistance between the pressing belt 62 and the planar heating element 64.

Surface Roughness Ra

The surface roughness Ra1 of the sliding surface of the sliding member is 0.20 μm or more and is preferably 0.20 μm or more and 5.00 μm or less, more preferably 0.20 μm or more and 2.00 μm or less, and still more preferably 0.20 μm or more and 1.00 μm or less.

When the surface roughness Ra1 is equal to or less than the above upper limit, the irregularities on the sliding surface of the sliding member are less likely to scratch the inner circumferential surface of the second rotatable member. When the surface roughness Ra1 is equal to or more than the lower limit, the lubricant interposed between the sliding member and the second rotatable member is more easily retained in a suitable manner.

No particular limitation is imposed on the method for adjusting the surface roughness Ra1 of the sliding surface of the sliding member within the above range. Examples the method include: a method in which the sliding surface of the sliding member is formed as a glass layer and the surface of the glass layer is ground using, for example, sandpaper with a prescribed grit size (e.g., 0.05 μm or more and 0.15 μm or less) to form convex shapes; and a method in which the sliding surface of the sliding member is formed as a glass layer and the temperature of firing after the formation of the glass layer is set to 550° C. or higher and 1000° C. or lower (more preferably 700° C. or higher and 900° C. or lower).

The surface roughness Ra2 of the inner circumferential surface of the second rotatable member is preferably 0.20 μm or more and 3.00 μm or less, more preferably 0.25 μm or more and 2.00 μm or less, and still more preferably 0.30 μm or more and 1.00 μm or less.

When the surface roughness Ra2 of the inner circumferential surface of the second rotatable member is equal to or lower than the above upper limit, the lubricant interposed between the inner circumferential surface of the second rotatable member and the sliding member is less likely to be discharged from the irregular portions on the inner circumferential surface of the second rotatable member. When the surface roughness Ra2 of the inner circumferential surface of the second rotatable member is equal to or more than the lower limit, the lubricant interposed between the sliding member and the second rotatable member can be more easily retained in a suitable manner.

No particular limitation is imposed on the method for adjusting the surface roughness Ra2 of the inner circumferential surface of the second rotatable member within the above range. Examples of the method include a method in which irregularities are formed on the inner circumferential surface of the second rotatable member (e.g., the pressing belt) by shot blasting etc. (more preferably, shot blasting performed with the shot blasting time per unit area, the bead diameter, etc. controlled).

The surface roughness Ra1 and the surface roughness Ra2 are determined as follows.

A part of the surface layer of the sliding surface of the sliding member or the inner circumferential surface of the second rotatable member is cut out using, for example, a cutter to obtain a measurement specimen. The measurement specimen is subjected to measurement using a contact surface roughness meter (for example, SURFCOM 1400A manufactured by TOKYO SEIMITSU Co., Ltd.). The measurement is performed according to JIS B0601-1994 under the conditions of an evaluation length Ln of 2.5 mm, a reference length L of 0.8 mm, and a cutoff value of 0.008 mm.

The surface roughness Ra1 of the sliding surface of the sliding member may be smaller than the surface roughness Ra2 of the inner circumferential surface of the second rotatable member.

When the surface roughness Ra1 is smaller than the surface roughness Ra2, the degree of irregularities on the sliding surface of the sliding member is smaller than the degree of irregularities on the inner circumferential surface of the second rotatable member. In this case, when the sliding member in contact with the second rotatable member slides thereon, the occurrence of scratches on the inner circumferential surface of the second rotatable member is further reduced.

The difference (Ra2−Ra1) between the surface roughness Ra1 of the sliding surface of the sliding member and the surface roughness Ra2 of the inner circumferential surface of the second rotatable member is preferably 0.05 μm or more and 2.00 μm or less, more preferably 0.07 μm or more and 1.00 μm or less, and still more preferably 0.08 μm or more and 0.60 μm or less. When the difference is equal to or less than the upper limit, the convex portions of the irregularities on the sliding surface of the sliding member are less likely to scratch the inner circumferential surface of the pressing belt 62. When the difference is equal to or more than the lower limit, the irregularities on the sliding surface of the sliding member are maintained appropriately, so that the lubricant interposed between the pressing belt 62 and the sliding member can be more easily retained. Therefore, the inner circumferential surface of the pressing belt 62 is less likely to be scratched.

Material Ratio Rmr

The material ratio Rmr of the sliding surface of the sliding member is 35% or more, preferably 36% or more and 75% or less, more preferably 37% or more and 70% or less, and still more preferably 38% or more and 65% or less. These are values when the cutting level is 10%. When the material ratio Rmr is equal to or more than the lower limit, the convex portions of the irregularities on the sliding surface of the sliding member are less likely to scratch the inner circumferential surface of the pressing belt 62. When the material ratio Rmr is equal to or less than the upper limit, the irregularities on the sliding surface of the sliding member are maintained appropriately, and the lubricant interposed between the pressing belt 62 and the sliding member can be more easily retained. Therefore, the inner circumferential surface of the pressing belt 62 is less likely to be scratched.

The material ratio Rmr (c %) (c represents the cutting level (%)) of the sliding surface of the sliding member is a value measured as described below according to JIS B 0601-1994.

No particular limitation is imposed on the method for adjusting the material ratio Rmr of the sliding surface of the sliding member within the above range. Examples of the method include: a method in which the sliding surface of the sliding member is formed as a glass layer and the surface of the glass layer is ground using, for example, sandpaper with a prescribed grit size (e.g., 0.05 μm or more and 0.15 μm or less) to form convex shapes; and a method in which the sliding surface of the sliding member is formed as a glass layer and the temperature of firing after the formation of the glass layer is set to 550° C. or higher and 1000° C. or lower (more preferably 700° C. or higher and 900° C. or lower).

Hardness

The hardness A of the sliding surface of the sliding member may be higher than the hardness B of the inner circumferential surface of the second rotatable member. In this case, the sliding surface of the sliding member is not excessively hard, and therefore the inner circumferential surface of the pressing belt 62 is less likely to be scratched.

The difference (A−B) between the hardness A of the sliding surface of the sliding member and the hardness B of the inner circumferential surface of the second rotatable member is preferably 10 or more and 600 or less, more preferably 10 or more and 500 or less, and still more preferably 50 or more and 100 or less. In this case, the sliding surface of the sliding member is not excessively hard, and therefore the inner circumferential surface of the pressing belt 62 is less likely to be scratched.

The hardness A of the sliding surface of the sliding member is preferably 100 or more and 600 or less and more preferably 500 or more and 600 or less. When the hardness A of the sliding surface of the sliding member is equal to or less than the upper limit, the sliding surface of the sliding member is not excessively hard, and therefore the inner circumferential surface of the pressing belt 62 is less likely to be scratched. When the hardness A is equal to or more than the lower limit, the lubricant interposed between the sliding member and the inner circumferential surface of the pressing belt 62 can be more easily retained.

No particular limitation is imposed on the method for adjusting the hardness A of the sliding surface of the sliding member within the above range. Examples of the method include a method in which the sliding surface of the sliding member is formed as a glass layer.

The hardness B of the inner circumferential surface of the second rotatable member is preferably 70 or more and 500 or less and more preferably 100 or more and 400 or less. When the hardness B of the inner circumferential surface of the second rotatable member is within the above range, excessive friction does not occur between the sliding member and the second rotatable member when they slide against each other, and the occurrence of scratches on the inner circumferential surface of the second rotatable member is further reduced.

No particular limitation is imposed on the method for adjusting the hardness B of the inner circumferential surface of the second rotatable member within the above range. Examples of the method include: a method in which the inner circumferential surface of the second rotatable member is formed as a resin layer or a plating layer; and a method in which a ceramic or a carbon-based filler is added.

The hardness of the sliding surface of the sliding member and the hardness of the inner circumferential surface of the second rotatable member are each Vickers hardness and are measured by the following method. A microhardness meter (MVK-HVL manufactured by Akashi Seisakusho, Ltd.) is used to press an indenter into the surface of a measurement object, and the Vickers hardness Hv is measured under the conditions of a pressing load of 10 gf and a pressing time of 20 s. The surface of the measurement object is ground, and the measurement is performed at a depth of 20 μm from the surface. This procedure is performed at five positions, and the average value is used as the Vickers hardness Hv.

—Pressing Roller 52 (Example of First Rotatable Member)—

The pressing roller 52 includes a metallic shaft portion 54 extending in the depth direction of the apparatus and including a heat source such as a halogen lamp disposed thereinside, a cylindrical elastic layer 56 through which the shaft portion 54 passes; and a release layer 58 that covers the elastic layer 56.

The shaft portion 54 is formed from a cylindrical body made of a metal such as aluminum or stainless steel.

The elastic layer 56 is made of, for example, an HTV silicone rubber or a fluorocarbon rubber (having a JIS-A rubber hardness of about 45 degrees, the rubber hardness being measured using an A-type hardness meter of the spring type manufactured by Teclock Corporation under a load of 1,000 gf according to JIS K6301) and has a thickness of about 2 mm or more and about 5 mm or less.

The release layer 58 is made of, for example, a fluorocarbon rubber, a silicone rubber, a fluorocarbon resin, or a silicone resin and has a thickness of 20 μm or more and 50 μm or less. Of course, these are not limitations, and a well-known material may be used.

The pressing roller 52 serves as a fixing roller and is driven to rotate such that its peripheral speed is adjusted to, for example, 260 mm/sec by an unillustrated driving source. The outer diameter of the pressing roller 52 is generally, for example, about 25 mm or more and about 80 mm or less.

The surface temperature of the pressing roller 52 is detected by an unillustrated temperature sensor in contact with its surface and controlled to, for example, 175° C. by an unillustrated control circuit.

—Pressing Belt 62 (Example of Second Rotatable Member)—

The pressing belt 62 is formed so as to contain at least a resin. The resin is a heat-resistant resin. The term "heat-resistant" means that the resin does not melt or decompose even when its temperature reaches the heating temperature (e.g., the fixing temperature) of the fixing device. The same applies to the following.

The pressing belt 62 may be a single layer body composed of a resin base layer, a layered body composed of a resin base layer, an elastic layer disposed on the resin base layer, and a release layer disposed on the elastic layer, or a layered body composed of a resin base layer and a release layer disposed on the resin base layer. The resin base layer may optionally contain another conducting material other than the resin.

Examples of the resin contained in the resin base layer include polyimide resins, polyamide-imide resins, polyether ether ketone resins, polyphenylene sulfide resins, polyethersulfone resins, polysulfone resins, and polyphenylsulfone resins. One resin may be used alone, or a combination of two or more may be used. In particular, the resin contained is more preferably a polyimide resin.

Examples of the polyimide resins include imidized products of polyamic acids (precursors of polyimide resins) that are polymers of tetracarboxylic dianhydrides and diamine compounds.

Examples of the polyimide resins include resins having a structural unit represented by the following general formula (I).

General formula (I)

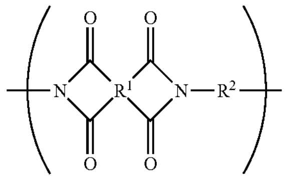

In general formula (I), $R^1$ represents a tetravalent organic group, and $R^2$ represents a divalent organic group.

Examples of the tetravalent organic group represented by $R^1$ include aromatic groups, aliphatic groups, alicyclic groups, combinations of aromatic and aliphatic groups, and substituted groups thereof. Specific examples of the tetravalent organic group include residues of tetracarboxylic dianhydrides described later.

Examples of the divalent organic group represented by $R^2$ include aromatic groups, aliphatic groups, alicyclic groups, combinations of aromatic and aliphatic groups, and substituted groups thereof. Specific examples of the divalent organic group include residues of diamine compounds described later.

Specific examples of the tetracarboxylic dianhydride used as a raw material of the polyimide resin include pyromellitic dianhydride, 3,3',4,4'-benzophenonetetracarboxylic dianhydride, 3,3',4,4'-biphenyltetracarboxylic dianhydride, 2,3,3',4-biphenyltetracarboxylic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 2,2'-bis(3,4-dicarboxyphenyl)sulfonic dianhydride, perylene-3,4,9,10-tetracarboxylic dianhydride, bis(3,4-dicarboxyphenyl)ether dianhydride, and ethylenetetracarboxylic dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenylsulfone, 1,5-diaminonaphthalene, m-phenylenediamine, p-phenylenediamine, 3,3'-dimethyl-4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino-tert-butyl)toluene, bis(p-β-amino-tert-butylphenyl)ether, bis(p-β-methyl-δ-aminophenyl)benzene, bis-p-(1,1-dimethyl-5-amino-pentyl)benzene, 1-isopropyl-2,4-m-phenylenediamine, m-xylylenediamine, p-xylylenediamine, di(p-aminocyclohexyl) methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine,
3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, and $H_2N(CH_2)_3N(CH_3)_2(CH_2)_3NH_2$.

Examples of the polyamide-imide resin include resins having a repeating unit including an imide bond and an amide bond.

More specific examples of the polyamide-imide resin include a polymer of a trivalent carboxylic acid compound (referred to also as a tricarboxylic acid) having an acid anhydride group with a diisocyanate compound or a diamine compound.

The tricarboxylic acid may be trimellitic anhydride or a derivative thereof. The tricarboxylic acid may be used in combination with a tetracarboxylic dianhydride, an aliphatic dicarboxylic acid, an aromatic dicarboxylic acid, etc.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include compounds that have structures similar to the structures of the above isocyanates and have amino groups instead of the isocyanato groups.

The resin base layer may contain, in addition to the resin, additional components. Examples of the additional components include a conducting material, a filler for improving mechanical strength, an antioxidant for preventing thermal deterioration, a surfactant, and a heat resistant antioxidant.

In the above example, the first rotatable member is the pressing roller, and the second rotatable member is the pressing belt. However, in another embodiment, the first rotatable member may be a pressing roller, and the second rotatable member may be a heating belt.

When the first rotatable member is a pressing roller, the structure of the pressing roller may be the same as the structure of the pressing roller 52 described above.

When the second rotatable member is a heating belt, the structure of the heating belt may be the same as the structure of the pressing belt 62 described above.

In particular, when the second rotatable member is a heating belt, the heating belt may be a single layer body composed of a resin base layer forming the inner circumferential surface of the heating belt, a layered body including the resin base layer forming the inner circumferential surface of the heating belt, an elastic layer disposed on the resin base layer, and a release layer disposed on the elastic layer, a layered body including the resin base layer forming the inner circumferential surface of the heating belt and a release layer disposed on the resin base layer, or a layered body including the resin base layer forming the inner circumferential surface of the heating belt, a metal layer disposed on the resin base layer, an elastic layer disposed on the metal base layer, and a release layer disposed on the elastic layer.

The elastic layer will be described.

The elastic layer contains a heat resistant elastic material.

Examples of the heat resistant elastic material include silicone rubber and fluorocarbon rubber.

Examples of the silicone rubber include RTV (Room Temperature Vulcanizing) silicone rubber, HTV (High Temperature Vulcanizing) silicone rubber, and liquid silicone rubber. Specific examples include polydimethyl silicone rubber, methylvinyl silicone rubber, methylphenyl silicone rubber, and fluorosilicone rubber.

Examples of the fluorocarbon rubber include vinylidene fluoride-based rubber, tetrafluoroethylene/propylene-based rubber, tetrafluoroethylene/perfluoromethyl vinyl ether rubber, phosphazene-based rubber, and fluoropolyether.

The elastic layer may contain additional components. Examples of the additional components include a filler, a conducting material, a softener (such as a paraffin-based softener), a processing aid (such as stearic acid), an antioxidant (such as an amine-based antioxidant), a vulcanizing agent (sulfur, a metal oxide, a peroxide, etc.), and a functional filler (such as alumina).

The release layer will be described.

The release layer contains, for example, a heat resistant release material.

Examples of the heat resistant release material include fluorocarbon rubber, fluorocarbon resins, silicone resins, and polyimide resins.

In particular, the heat resistant release material may be a fluorocarbon resin. Specific examples of the fluorocarbon resin include: polytetrafluoroethylene (PTFE); and tetrafluoroethylene-perfluoroalkyl vinyl ether copolymers (PFA) such as tetrafluoroethylene-perfluoromethyl vinyl ether copolymers (MFA), tetrafluoroethylene-perfluoroethyl vinyl ether copolymers (EFA), and tetrafluoroethylene-perfluoropropyl vinyl ether copolymers. Other examples include tetrafluoroethylene-hexafluoropropylene copolymers (FEP), ethylene-tetrafluoroethylene copolymers (ETFE), polyvinylidene fluoride (PVDF), polychlorotrifluoroethylene (PCTFE), and polyvinyl fluoride (PVF).

Of these, polytetrafluoroethylene (PTFE) and tetrafluoroethylene-perfluoroalkyl vinyl ether copolymers (PFA) such as tetrafluoroethylene-perfluoromethyl vinyl ether copolymers (MFA) and tetrafluoroethylene-perfluoroethyl vinyl ether copolymers (EFA) may be used in terms of heat resistance, mechanical properties, etc.

The thickness of the release layer is set to preferably 5 μm to 100 μm and more preferably 10 μm to 30 μm.

—Pressing Member 68 (Example of Pressing Member)—

As shown in FIG. 2, the pressing member 68 is disposed along an inner surface 90 of the pressing belt 62 and located on the side opposite from the pressing roller 52 with the planar heating element 64 interposed therebetween. The pressing member 68 is formed of a resin material such as a highly heat resistant LCP (liquid crystal polymer) and extends in the depth direction of the apparatus.

A cross section of the pressing member 68 orthogonal to its longitudinal direction has a U shape having an opening on the planar heating element 64 side, and the pressing member 68 is in contact with the planar heating element 64 at its opposite ends when viewed in the depth direction of the apparatus and thereby holds the planar heating element 64.

—Planar Heating Element 64 (Example of Sliding Member)—

The sliding member is interposed between the inner circumferential surface of the second rotatable member and the pressing member.

The sliding member may be a resin sheet formed of a heat resistant resin or may include a planar heating element such as a metal plate so long as the sliding member has an irregular sliding surface and its surface roughness Ra1 and material ratio Rmr are within the above ranges. When the sliding member is a resin sheet, a well-known additional additive may be added to the sliding member. Only one sliding member may be used, or two or more sliding members may be used. When the two or more sliding members include the planar heating element 64, the sliding member used as the planar heating element 64 is disposed on the sliding surface side.

Examples of the heat resistant resin include fluorocarbon resins, polyimide resins, polyamide resins, polyamide-imide resins, polyetherimide resins, polyethersulfone resins, polyether ketone resins, bismaleimide-triazine resins, aramid resins, polyphenylene resins, and polyphenylene sulfide resins. In terms of heat resistance and slidability, fluorocarbon resins are preferred.

Among the fluorocarbon resins, a fluorocarbon resin crosslinked with an electron beam may be used. Specific examples of such a fluorocarbon resin include polytetrafluoroethylene (PTFE) crosslinked with an electron beam. A mixture prepared by mixing a non-crosslinked fluorocarbon resin (e.g., non-crosslinked PTFE) and a fluorocarbon resin crosslinked with an electron beam (e.g., electron beam crosslinked PTFE) may be used.

The heat resistant resin is a resin that does not melt or decompose even when its temperature reaches the heating temperature (e.g., the fixing temperature) of the device.

The sliding member may be a porous member (having many pores). In this case, the ability to retain the lubricant is improved. Examples of the porous sliding member include a porous member prepared by foaming a heat resistant resin, a porous member prepared by stretching a heat resistant resin uniaxially or biaxially, and a sintered porous member.

When a porous sliding member is used, a lubricant permeation prevention member (sheet member) that prevents the lubricant S from permeating into the pressing member 68 may be interposed between the sliding member and the pressing member 68.

From the viewpoint of allowing the surface roughness Ra1 and the material ratio Rmr to satisfy the above-described ranges and of further improving the fixability onto a recording medium, it is preferably that the sliding member includes a planar heating element such as a metal plate, and it is more preferable that the sliding member is a planar heating element having a glass layer at the sliding surface.

For example, the planar heating element is formed from an elongated plate-shaped body extending in the longitudinal direction of a heating portion such as a nip and includes an electrically insulating substrate, an insulating layer formed of a heat resistant polyimide-based resin, a pair of feeding electrodes, and resistors that are made of, for example, stainless steel and generate heat when electric power is supplied from the electrodes. The electrodes and the resistors are connected via feeding portions, and the electrodes, the feeding portions, and the heat generating portions are embedded in the insulating layer. The electrodes of the planar heating element are grounded through the resistors.

The glass layer is a concept that encompasses: silica glass; water glass (including an aqueous solution of sodium metasilicate, sodium silicate, etc.); oxide glass (e.g., borate glass containing $B_2O_3$ as a main component and glass containing $P_2O_5$, $GeO_2$, $TeO_2$, $V_2O_5$, etc. as a main component); non-oxide glass (e.g., glass containing a chalcogenide such as $As_2S_3$, $GeS_2$, $As_2Se_3$, etc. as a main component); and halide glass such as $ZrF_4$, $BaF_2$, $AlF_3$, etc. The silica glass means a silicon dioxide layer that does not exhibit a clear crystalline state in a diffraction spectrum determined by a powder X-ray diffraction method (i.e., that is in an amorphous state). In particular, the glass layer may be silica glass.

—Lubricant S—

The lubricant S is interposed between the inner circumferential surface of the pressing belt 62 and the sliding member.

Examples of the lubricant S include grease, silicone oils (such as dimethyl silicone oil, methylphenyl silicone oil, amino-modified silicone oil, carboxy-modified silicone oil, silanol-modified silicone oil, and sulfonic acid-modified silicone oil) and fluoro oils (such as fluorosilicone oil and perfluoropolyether oil). In particular, from the viewpoint of adjusting the viscosity of the lubricant within a range described later, it is preferable that the lubricant contains silicone oil, and it is more preferable that the lubricant contains long-chain alkyl-modified silicone oil (for example, having 3 or more carbon atoms).

The lubricant may contain an additional additive (such as an antioxidant).

The viscosity of the lubricant is preferably 20 $mm^2/s$ or more and 1000 $mm^2/s$ or less, more preferably 50 $mm^2/s$ or more and 600 $mm^2/s$ or less, and still more preferably 50 $mm^2/s$ or more and 300 $mm^2/s$ or less.

When the viscosity of the lubricant is within the above range, appropriate flowability and retainability are imparted, and the lubricant can be easily interposed between the inner circumferential surface of the second rotatable member and the pressing member. Moreover, even when the inner circumferential surface of the second rotatable member is scratched, the scratches can be easily filled with the lubricant.

No particular limitation is imposed on the method for adjusting the viscosity of the lubricant within the above range. Examples of the method include a method in which long-chain alkyl-modified silicone oil having a low-molecular weight side chain, exhibiting relatively weak intermolecular interaction, and having a main chain with a controlled molecular weight is used as the lubricant.

The viscosity of the lubricant is a viscosity at room temperature (23° C.) and measured using a rotational viscometer Rheomat 115 (manufactured by Contraves).

The lubricant S may contain an additional component other that the oil. Examples of the additional component include grease (such as silicone grease), a heat transfer agent, an antioxidant, a surfactant, silicone particles, an organic metal salt, and a hindered amine.

(Image Forming Operations of Image Forming Apparatus)

The image forming operations of the image forming apparatus according to the exemplary embodiment will be described. The operation for forming an yellow image in the first process cartridge 10Y will be described as a representative image forming operation.

First, before the image forming operation, the charging roller 2Y charges the surface of the photoconductor 1Y to a potential of, for example, about −600 V.

The photoconductor 1Y is formed, for example, by stacking a photosensitive layer on an electrically conductive base. The resistance of the photosensitive layer is generally high. One property of the photosensitive layer is that, when the photosensitive layer is irradiated with the laser beam 3Y, the specific resistance of the portion irradiated with the laser beam is changed. Therefore, the laser beam 3Y is outputted through the exposure device 3 onto the charged surface of the photoconductor 1Y according to yellow image data sent from an unillustrated controller. The photosensitive layer on the surface of the photoconductor 1Y is irradiated with the laser beam 3Y, and an electrostatic latent image having a yellow print pattern is thereby formed on the surface of the photoconductor 1Y.

The electrostatic latent image formed on the photoconductor 1Y as described above is rotated to a developing position as the photoconductor 1Y runs. The electrostatic latent image on the photoconductor 1Y is visualized at the developing position by the developing device 4Y (a toner image is formed).

The developing device 4Y houses a developer containing, for example, a yellow toner and a carrier. The yellow toner is agitated in the developing device 4Y and thereby frictionally charged. The charged yellow toner has a charge with the same polarity (negative polarity) as the charge on the photoconductor 1Y. As the surface of the photoconductor 1Y passes through the developing device 4Y, the yellow toner electrostatically adheres only to charge-eliminated latent image portions on the surface of the photoconductor 1Y, and the latent image is thereby developed with the yellow toner. Then the photoconductor 1Y with the yellow toner image formed thereon continues running, and the toner image developed on the photoconductor 1Y is transported to a first transfer position.

When the yellow toner image on the photoconductor 1Y is transported to the first transfer position, a first transfer bias is applied to the first transfer roller 5Y, and an electrostatic force directed from the photoconductor 1Y toward the first transfer roller 5Y acts on the toner image, so that the toner image on the photoconductor 1Y is transferred onto the intermediate transfer belt 20. The transfer bias applied in this case has a (+) polarity opposite to the (−) polarity of the toner and is controlled to, for example, about +10 μA in the first process cartridge 10Y by the controller (not shown).

The first transfer biases applied to the first transfer rollers 5M, 5C, and 5K of the second process cartridge 10M and subsequent process cartridges are controlled in the same manner as that for the first process cartridge.

The intermediate transfer belt 20 with the yellow toner image transferred thereon in the first process cartridge 10Y is sequentially transported through the second to fourth process cartridges 10M, 10C, and 10K, and toner images of respective colors are superimposed and multi-transferred.

Then the intermediate transfer belt 20 with all the color toner images multi-transferred thereon in the first to fourth process cartridges reaches a second transfer portion that is composed of the intermediate transfer belt 20, the support roller 24 in contact with the inner circumferential surface of the intermediate transfer belt 20, and a second transfer roller (an example of a second transferring device) 26 disposed on the image holding surface side of the intermediate transfer belt 20. A recording medium P is supplied to a gap between the secondary transfer roller 26 and the intermediate transfer belt 20 through a supply mechanism, and a second transfer bias is applied to the support roller 24. The transfer bias applied in this case has the same polarity (−) as the polarity (−) of the toner, and an electrostatic force directed from the intermediate transfer belt 20 toward the recording medium P acts on the toner image, so that the toner image on the intermediate transfer belt 20 is transferred onto the recording medium P. In this case, the second transfer bias is determined according to a resistance detected by resistance detection means (not shown) for detecting the resistance of the second transfer portion and is constant-voltage-controlled.

The intermediate transfer belt 20, the first transfer roller 5Y, and the second transfer roller 26 correspond to an example of the transfer device.

Then the recording medium P is fed to the fixing device 60 and inserted into a contact region in which the pressing roller 52 rotated in the direction indicated by an arrow and the pressing belt 62 are in pressure contact with each other. In this case, the recording medium P is inserted such that the surface of the recording medium P on which the unfixed toner image has been formed and the surface of the pressing roller 52 face each other. As the recording medium P passes through the contact region, heat and pressure are applied to the recording medium P, and the unfixed toner image is fixed to the recording medium P. The recording medium after the fixation passes through the contact region, then separated from the pressing roller 52, and discharged from the fixing device 60.

The fixation processing is performed as described above, and the image is permanently fixed to the recording medium P. The recording medium P with the color image fixed thereon is transported to an ejection portion, and a series of the color image formation operations is thereby completed.

EXAMPLES

Examples will next be described. However, the present disclosure is not at all limited to these Examples. In the following description, "parts" and "%" are based on mass, unless otherwise specified.

<Production of Pressing Belts>

(Production of Pressing Belt (1))

Irregularities are formed on the surface of an aluminum-made circular cylindrical core body by shot blasting (bead diameter: 100 μm) at a shot blasting time per unit area of 1 $min/mm^2$. A silicone-based release agent is applied to the surface of the circular cylindrical core body and subjected to baking treatment at 300° C. for 1 hour. Then the resulting surface is dip-coated with an N-methylpyrrolidone solution containing a precursor of a polyimide resin, and the coating is dried at 100° C. for 1 hour. A resin base layer forming the inner circumferential surface of a pressing belt is thereby formed.

Next, the outer circumferential surface of the resin base layer is coated with a fluorocarbon resin dispersion (specifically, a PTFE dispersion), and the coating is dried at 60° C. for 10 minutes in a firing furnace, gradually heated to 380° C., fired for 20 minutes, and cooled to room temperature to thereby form a release layer.

Then the resin base layer with the release layer formed thereon is pulled out of the core body and cut to a desired size using a cutter to thereby obtain a pressing belt (1).

(Production of Pressing Belt (2))

A pressing belt is obtained using the same procedure as in the production of the pressing belt (1) except that irregularities are formed on the surface of an aluminum-made circular cylindrical core body by shot blasting at a shot blasting time per unit area of 5 $min/mm^2$ to thereby control the surface roughness of the circular cylindrical core body.

(Production of Pressing Belt (3))

A pressing belt is obtained using the same procedure as in the production of the pressing belt (1) except that irregularities are formed on the surface of an aluminum-made circular cylindrical core body by shot blasting at a shot blasting time per unit area of 0 $min/mm^2$ to thereby control the surface roughness of the circular cylindrical core body.

(Production of Pressing Belt (4))

A pressing belt is obtained using the same procedure as in the production of the pressing belt (1) except that 30 parts of SiC particles (FUJIMI INCORPORATED) are added to the polyimide precursor solution.

(Production of Pressing Belt (5))

A pressing belt is obtained using the same procedure as in the production of the pressing belt (1) except that 15 parts of SiC particles (FUJIMI INCORPORATED) are added to the polyimide precursor solution.

<Production of Sliding Members>

(Production of Sliding Member (1))

Stainless steel-made heat generating portions are printed on an alumina substrate and fired at 850° C. Then the resistance value is measured, and a pair of electrodes are printed and further fired at 850° C. Next, the surface of the alumina substrate is coated with silica glass such that these electrodes and the heat generating portions are covered with the silica glass, and the resulting substrate is fired at 850° C. and then again fired at 870° C. Then the surface is ground using sandpaper with a grit size of 0.1 μm until the material ratio Rmr reaches a value shown in Table 1, and a sliding member serving as a planar heating element is thereby obtained.

(Production of Sliding Member (2))

A sliding member serving as a planar heating element is obtained using the same procedure as in the production of the sliding member (1) except that the re-firing temperature performed after the surface is coated with the silica glass is changed to 950° C.

(Production of Sliding Member (3))

A sliding member serving as a planar heating element is obtained using the same procedure as in the production of the sliding member (1) except that the re-firing temperature performed after the surface is coated with the silica glass is changed to 600° C.

(Production of Sliding Member (4))

A sliding member serving as a planar heating element is obtained using the same procedure as in the production of the sliding member (1) except that the treatment time using the sandpaper is doubled.

(Production of Sliding Member (5))

A sliding member serving as a planar heating element is obtained using the same procedure as in the production of the sliding member (1) except that the treatment time using the sandpaper is set to 0.75 times that for the sliding member (1).

(Production of Sliding Member (6))

A sliding member serving as a planar heating element is obtained using the same procedure as in the production of the sliding member (1) except that the re-firing temperature performed after the surface is coated with the silica glass is set to 870° C. and that the resulting substrate is cooled and re-fired at 870° C.

(Production of Sliding Member (7))

A sliding member serving as a planar heating element is obtained using the same procedure as in the production of the sliding member (1) except that the silica glass is changed to tempered glass (product name Panda King manufactured by Xuhong).

(Production of Sliding Member (8))

A sliding member serving as a planar heating element is obtained using the same procedure as in the production of the sliding member (1) except that an electroless nickel plating layer is formed on the surface of the glass.

(Production of Sliding Member (9))

A polyether ether ketone (PEEK) resin (Victrex 450G manufactured by Victrex) is heated to 380° C. and melted in a twin-screw extrusion melt kneader (twin-screw melt kneading extruder L/D60 (manufactured by PARKER CORPORATION)). Silicone resin particles are supplied from a side portion of the kneader using a side feeder, and the mixture is melted and kneaded. The kneaded molten mixture is placed in a water bath to cool and solidify the mixture, and the resulting mixture is cut to a desired size to thereby obtain resin mixture pellets containing the silicone resin particles.

The obtained resin mixture pellets are fed to a single-screw extruder, and the molten resin mixture is extruded from a T die (melt discharge gap: 200 μm) heated to 380° C. into a sheet shape. The sheet is wound around a cooling roller at 190° C. to cool the sheet. Using a roller having a 100-mesh SUS metal net wound around the surface of the roller, the shape of the metal net is transferred to the cooled sheet at 400° C. under a pressure of 10 MPa to obtain a sheet having irregularities. The sheet having irregularities is cut into a prescribed size to thereby obtain a sliding member (9).

(Production of Sliding Member (10))

A sliding member serving as a planar heating element is obtained using the same procedure as in the production of the sliding member (1) except that the re-firing temperature performed after the surface is coated with the silica glass is changed to 600° C. and that the treatment time with the sandpaper is set to 1.5 times that for the sliding member (1).

(Production of Sliding Member (11))

A sliding member serving as a planar heating element is obtained using the same procedure as in the production of the sliding member (1) except that the treatment time with the sandpaper is set to 0.9 times that for the sliding member (1).

The ten-point average roughness of the sliding surface of each of the sliding members is measured according to the specifications of JIS B-0601. The results are shown in Table 1. The following properties determined by the measurement methods described above are summarized in Table 1.

- The surface roughness Ra1 of the sliding surface of the sliding member.
- The material ratio Rmr of the sliding surface of the sliding member.
- The surface roughness Ra2 of the inner circumferential surface of the second rotatable member.
- The hardness A of the sliding surface of the sliding member.
- The hardness B of the inner circumferential surface of the second rotatable member.
- The difference (the surface roughness Ra2 of the inner circumferential surface of the second rotatable member−the surface roughness Ra1 of the sliding surface of the sliding member).
- The difference (the hardness A of the sliding surface of the sliding member−the hardness B of the inner circumferential surface of the second rotatable member).
- The viscosity of the lubricant.

<Lubricants>

- Lubricant (1): Long chain alkyl modified-silicone oil (product name: KF-4003 manufactured by Shin-Etsu Chemical Co., Ltd.).
- Lubricant (2): Fluoroalkyl-modified silicone oil (product name: FL-100-1000CS manufactured by Shin-Etsu Chemical Co., Ltd.).
- Lubricant (3): Long chain alkyl modified-silicone oil (product name: KF-4917 manufactured by Shin-Etsu Chemical Co., Ltd.).

Examples 1 to 17 and Comparative Examples 1 to 6

A pressing belt, a sliding member, and a lubricant are combined as shown in Table 1 and attached to a fixing device of an image forming apparatus obtained by modifying "APEOS PORT Print C5570" manufactured by FUJIFILM Business Innovation Corp.

Each apparatus is used as an image forming apparatus in the corresponding Example, and the following evaluation is performed.

<Evaluation: Presence or Absence of Scratches on Inner Circumferential Surface of Pressing Belt>

A solid image (solid blue image, density: 100%) is continuously outputted onto A4 paper sheets (1000 kPV). Then the pressing belt is detached from the image forming apparatus, and scratches in a 100 mm×100 mm region on the inner circumferential surface of the pressing belt are evaluated according to the following criteria.

A: No scratches.

B: The number of scratches found is 1 or more and less than 10.

C: The number of scratches found is 10 or more and less than 50.

D: The number of scratches found is 50 or more.

<Evaluation: Increase in Torque on Pressing Belt>

The increase in the torque on the pressing belt is measured as follows.

A measurement gear of a direct torque meter (a device produced in FUJIFILM Business Innovation Corp.) is fitted to a gear portion of a fixing roller, and the torque value $A_0$ at the beginning of the driving of the fixing roller and the torque value $A_{100}$ required after 100 kPV are measured (unit: Nm). The increase in the driving torque ($A_{100}-A_0$) on the fixing roller is evaluated as the increase in the torque on the pressing belt.

If the increase in the driving torque is excessively large, the load on the driving gear of the fixing roller serving as a driving source is large, and this poses practical problems. One particularly problematic phenomenon is the formation of wrinkles on a paper sheet with an image printed thereon, and another problematic phenomenon is an unusual noise from the gear.

In Comparative Examples, the number of outputted sheets (kPV=1000 outputted sheets) when the driving torque reaches 0.9 N·m is shown.

TABLE 1

| | Planar heating element | | | | | | Pressing belt | | |
|---|---|---|---|---|---|---|---|---|---|
| | Type | Surface roughness of sliding surface Ra1 (μm) | Material ratio of sliding surface Rmr (%) | Ten-point average roughness of sliding surface Rz | Hardness of sliding surface ∧ — | Type of layer at sliding surface | Type | Surface roughness of inner circumferential surface Ra2 (μm) | Hardness of inner circumferential surface B — |
| Example 1 | 1 | 0.3 | 40 | 2 | 550 | Glass layer | 1 | 0.4 | 100 |
| Example 2 | 2 | 5.5 | 40 | 10 | 550 | Glass layer | 1 | 0.4 | 100 |
| Example 3 | 3 | 0.2 | 40 | 0.3 | 550 | Glass layer | 1 | 0.4 | 100 |
| Example 4 | 10 | 0.2 | 40 | 0.4 | 550 | Glass layer | 1 | 0.4 | 100 |
| Example 5 | 4 | 0.3 | 80 | 1.5 | 550 | Glass layer | 1 | 0.4 | 100 |
| Example 6 | 5 | 0.3 | 35 | 1 | 550 | Glass layer | 1 | 0.4 | 100 |
| Example 7 | 11 | 0.3 | 37 | 1.2 | 550 | Glass layer | 1 | 0.4 | 100 |
| Example 8 | 6 | 0.3 | 40 | 2 | 750 | Glass layer | 1 | 0.4 | 100 |
| Example 9 | 7 | 0.3 | 40 | 2 | 90 | Glass layer | 1 | 0.4 | 100 |
| Example 10 | 8 | 0.3 | 40 | 2 | 500 | Nickel plating | 1 | 0.4 | 100 |
| Example 11 | 9 | 0.3 | 40 | 2 | 200 | PEEK | 1 | 0.4 | 100 |
| Example 12 | 1 | 0.3 | 40 | 2 | 550 | Glass layer | 2 | 3 | 100 |
| Example 13 | 1 | 0.3 | 40 | 2 | 550 | Glass layer | 3 | 0.2 | 100 |
| Example 14 | 1 | 0.3 | 40 | 2 | 550 | Glass layer | 4 | 0.4 | 1500 |
| Example 15 | 1 | 0.3 | 40 | 2 | 550 | Glass layer | 5 | 0.4 | 550 |
| Example 16 | 1 | 0.3 | 40 | 2 | 550 | Glass layer | 1 | 0.4 | 100 |
| Example 17 | 1 | 0.3 | 40 | 2 | 550 | Glass layer | 1 | 0.4 | 100 |
| Comparative Example 1 | c1 | 0.1 | 30 | 0.5 | 550 | Glass layer | 1 | 0.4 | 100 |
| Comparative Example 2 | c2 | 0.1 | 50 | 0.7 | 550 | Glass layer | 1 | 0.4 | 100 |
| Comparative Example 3 | c3 | 0.2 | 30 | 1 | 550 | Glass layer | 1 | 0.1 | 100 |
| Comparative Example 4 | c4 | 3.9 | 30 | 15.6 | 400 | PTFE + glass | 1 | 0.4 | 100 |

TABLE 1-continued

| | | | | | | | | | |
|---|---|---|---|---|---|---|---|---|---|
| Comparative Example 5 | c4 | 1.6 | 30 | 6.2 | 400 | PTFE + glass | 1 | 0.4 | 100 |
| Comparative Example 6 | c4 | 9.9 | 30 | 39.5 | 400 | PTFE + glass | 1 | 0.4 | 100 |

| | Difference | | Lubricant | | Evaluation | |
|---|---|---|---|---|---|---|
| | Ra2 − Ra1 (μm) | Hardness A − hardness B — | Type | Viscosity $mm^2/s$ | Scratches on inner circumferential surface of second rotatable member | Increase in torque on pressing belt |
| Example 1 | 0.1 | 450 | 1 | 50 | A | 0.0 |
| Example 2 | −5.1 | 450 | 1 | 50 | B | 0.1 |
| Example 3 | 0.2 | 450 | 1 | 50 | A | 0.0 |
| Example 4 | 0.2 | 450 | 1 | 50 | B | 0.2 |
| Example 5 | 0.1 | 450 | 1 | 50 | B | 0.2 |
| Example 6 | 0.1 | 450 | 1 | 50 | B | 0.2 |
| Example 7 | 0.1 | 450 | 1 | 50 | A | 0.0 |
| Example 8 | 0.1 | 650 | 1 | 50 | B | 0.3 |
| Example 9 | 0.1 | −10 | 1 | 50 | B | 0.3 |
| Example 10 | 0.1 | 400 | 1 | 50 | B | 0.3 |
| Example 11 | 0.1 | 100 | 1 | 50 | C | 0.3 |
| Example 12 | 2.7 | 450 | 1 | 50 | B | 0.2 |
| Example 13 | −0.1 | 450 | 1 | 50 | B | 0.2 |
| Example 14 | 0.1 | −950 | 1 | 50 | B | 0.2 |
| Example 15 | 0.1 | 0 | 1 | 50 | B | 0.2 |
| Example 16 | 0.1 | 450 | 2 | 1050 | B | 0.3 |
| Example 17 | 0.1 | 450 | 3 | 20 | B | 0.3 |
| Comparative Example 1 | 0.3 | 450 | 1 | 50 | D | 100 kPV |
| Comparative Example 2 | 0.3 | 450 | 1 | 50 | D | 100 kPV |
| Comparative Example 3 | −0.1 | 450 | 1 | 50 | D | 50 kPV |
| Comparative Example 4 | −3.5 | 300 | 1 | 50 | C | 50 kPV |
| Comparative Example 5 | −1.2 | 300 | 1 | 50 | C | 50 kPV |
| Comparative Example 6 | −9.5 | 300 | 1 | 50 | C | 50 kPV |

As can be seen from the above results, in the fixing devices in the Examples, the wear of the inner circumferential surface of the pressing belt (second rotatable member) and the number of scratches thereon are less than those in the fixing devices in the Comparative Examples, and the increase in the torque on the pressing belt is also smaller.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) A fixing device including:

a first rotatable member;

a second rotatable member disposed in contact with the first rotatable member;

a pressing member that is disposed along an inner circumferential surface of the second rotatable member and presses the inner circumferential surface of the second rotatable member such that the second rotatable member is pressed against the first rotatable member;

a sliding member interposed between the inner circumferential surface of the second rotatable member and the pressing member; and a lubricant interposed between the inner circumferential surface of the second rotatable member and the sliding member, wherein the sliding member has an irregular sliding surface having a surface roughness Ra1 of 0.20 μm or more and a material ratio Rmr of 35% or more.

(((2))) The fixing device according to (((1))), wherein the surface roughness Ra1 is 0.20 μm or more and 5.00 μm or less.

(((3))) The fixing device according to (((1))) or (((2))), wherein the material ratio Rmr is 36% or more and 75% or less.

(((4))) The fixing device according to any one of (((1))) to (((3))), wherein the sliding member includes a planar heating element.

(((5) The fixing device according to (((4))), wherein the sliding member includes a glass layer at the sliding surface.

(((6))) The fixing device according to any one of (((1))) to (((5))), wherein the surface roughness Ra1 of the sliding surface of the sliding member is smaller than a surface roughness Ra2 of the inner circumferential surface of the second rotatable member.

(((7))) The fixing device according to (((6))), wherein the difference (Ra2−Ra1) between the surface roughness Ra1 of the sliding surface of the sliding member and the surface roughness Ra2 of the inner circumferential surface of the second rotatable member is 0.05 μm or more and 2.00 μm or less.

(((8))) The fixing device according to any one of (((1))) to ((7))), wherein a hardness A of the sliding surface of the sliding member is larger than a hardness B of the inner circumferential surface of the second rotatable member.

((9))) The fixing device according to (((8))), wherein the difference (A−B) between the hardness A of the sliding surface of the sliding member and the hardness B of the inner circumferential surface of the second rotatable member is 10 or more and 600 or less.

(((10))) The fixing device according to any one of (((1))) to (((9))), wherein the lubricant has a viscosity of 20 $mm^2/s$ or more and 1000 $mm^2/s$ or less.

(((11))) An image forming apparatus including:

an image holding member;

a latent image forming device that forms a latent image on a surface of the image holding member;

a developing device that develops the latent image using a developer to form a toner image;

a transfer device that transfers the developed toner image onto a recording medium; and the fixing device according to any one of (((1))) to (((10))), the fixing device fixing the toner image to the recording medium.

What is claimed is:

1. A fixing device comprising:

a first rotatable member;

a second rotatable member disposed in contact with the first rotatable member;

a pressing member that is disposed along an inner circumferential surface of the second rotatable member and presses the inner circumferential surface of the second rotatable member such that the second rotatable member is pressed against the first rotatable member;

a sliding member interposed between the inner circumferential surface of the second rotatable member and the pressing member; and a lubricant interposed between the inner circumferential surface of the second rotatable member and the sliding member, wherein the sliding member has an irregular sliding surface having a surface roughness Ra1 of 0.20 μm or more and a material ratio Rmr of 35% or more, the material ratio Rmr being measured according to JIS B 0601-1994 and representing a value when a cutting level is 10%.

2. The fixing device according to claim 1, wherein the surface roughness Ra1 is 0.20 μm or more and 5.00 μm or less.

3. An image forming apparatus comprising:

an image holding member;

a latent image forming device that forms a latent image on a surface of the image holding member;

a developing device that develops the latent image using a developer to form a toner image;

a transfer device that transfers the developed toner image onto a recording medium; and the fixing device according to claim 2, the fixing device fixing the toner image to the recording medium.

4. The fixing device according to claim 1, wherein the material ratio Rmr is 36% or more and 75% or less.

5. An image forming apparatus comprising:

an image holding member;

a latent image forming device that forms a latent image on a surface of the image holding member;

a developing device that develops the latent image using a developer to form a toner image;

a transfer device that transfers the developed toner image onto a recording medium; and the fixing device according to claim 4, the fixing device fixing the toner image to the recording medium.

6. The fixing device according to claim 1, wherein the sliding member includes a planar heating element.

7. The fixing device according to claim 6, wherein the sliding member includes a glass layer that configures the irregular sliding surface.

8. An image forming apparatus comprising:

an image holding member;

a latent image forming device that forms a latent image on a surface of the image holding member;

a developing device that develops the latent image using a developer to form a toner image;

a transfer device that transfers the developed toner image onto a recording medium; and the fixing device according to claim 7, the fixing device fixing the toner image to the recording medium.

9. An image forming apparatus comprising:

an image holding member;

a latent image forming device that forms a latent image on a surface of the image holding member;

a developing device that develops the latent image using a developer to form a toner image;

a transfer device that transfers the developed toner image onto a recording medium; and the fixing device according to claim 6, the fixing device fixing the toner image to the recording medium.

10. The fixing device according to claim 1, wherein the surface roughness Ra1 of the sliding surface of the sliding member is smaller than a surface roughness Ra2 of the inner circumferential surface of the second rotatable member.

11. The fixing device according to claim 10, wherein the difference (Ra2−Ra1) between the surface roughness Ra1 of the sliding surface of the sliding member and the surface roughness Ra2 of the inner circumferential surface of the second rotatable member is 0.05 μm or more and 2.00 μm or less.

12. An image forming apparatus comprising:

an image holding member;

a latent image forming device that forms a latent image on a surface of the image holding member;

a developing device that develops the latent image using a developer to form a toner image;

a transfer device that transfers the developed toner image onto a recording medium; and the fixing device according to claim 11, the fixing device fixing the toner image to the recording medium.

13. An image forming apparatus comprising:

an image holding member;

a latent image forming device that forms a latent image on a surface of the image holding member;

a developing device that develops the latent image using a developer to form a toner image;

a transfer device that transfers the developed toner image onto a recording medium; and the fixing device according to claim 10, the fixing device fixing the toner image to the recording medium.

14. The fixing device according to claim 1, wherein a Vickers hardness A of the sliding surface of the sliding member is larger than a Vickers hardness B of the inner circumferential surface of the second rotatable member, the hardness A being 500 or more and 600 or less.

15. The fixing device according to claim 14, wherein the difference (A–B) between the Vickers hardness A of the sliding surface of the sliding member and the Vickers hardness B of the inner circumferential surface of the second rotatable member is 10 HV or more and 600 HV or less.

16. An image forming apparatus comprising:

an image holding member;

a latent image forming device that forms a latent image on a surface of the image holding member;

a developing device that develops the latent image using a developer to form a toner image;

a transfer device that transfers the developed toner image onto a recording medium; and the fixing device according to claim 15, the fixing device fixing the toner image to the recording medium.

17. An image forming apparatus comprising:

an image holding member;

a latent image forming device that forms a latent image on a surface of the image holding member;

a developing device that develops the latent image using a developer to form a toner image;

a transfer device that transfers the developed toner image onto a recording medium; and the fixing device according to claim 14, the fixing device fixing the toner image to the recording medium.

18. The fixing device according to claim 1, wherein the lubricant has a viscosity of 20 $mm^2/s$ or more and 1000 $mm^2/s$ or less.

19. An image forming apparatus comprising:

an image holding member;

a latent image forming device that forms a latent image on a surface of the image holding member;

a developing device that develops the latent image using a developer to form a toner image;

a transfer device that transfers the developed toner image onto a recording medium; and the fixing device according to claim 18, the fixing device fixing the toner image to the recording medium.

20. An image forming apparatus comprising:

an image holding member;

a latent image forming device that forms a latent image on a surface of the image holding member;

a developing device that develops the latent image using a developer to form a toner image;

a transfer device that transfers the developed toner image onto a recording medium; and the fixing device according to claim 1, the fixing device fixing the toner image to the recording medium.

* * * * *